(12) United States Patent
Liu et al.

(10) Patent No.: US 12,554,297 B2
(45) Date of Patent: Feb. 17, 2026

(54) M.2 WLAN MODULE HOLDER

(71) Applicant: DELL PRODUCTS L.P., Round Rock, TX (US)

(72) Inventors: MengXiao Liu, Shanghai (CN); Min Bao, Shanghai (CN); Tao Chen, Shanghai (CN); Lu Bai, Shanghai (CN); Kunming Yu, Xiamen (CN); Shui Shun Lin, Xiamen (CN); Wei Li, Tianjin (CN)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 18/591,622

(22) Filed: Feb. 29, 2024

(65) Prior Publication Data

US 2025/0224781 A1    Jul. 10, 2025

(30) Foreign Application Priority Data

Jan. 8, 2024  (CN) .......................... 202410029586.8

(51) Int. Cl.
| | | |
|---|---|---|
| G06F 1/18 | (2006.01) | |
| G06F 1/185 | (2026.01) | |
| H04W 84/12 | (2009.01) | |
| H05K 1/18 | (2006.01) | |

(52) U.S. Cl.
CPC ............... *G06F 1/185* (2013.01); *H05K 1/18* (2013.01); *H04W 84/12* (2013.01); *H05K 2201/10189* (2013.01); *H05K 2201/10962* (2013.01)

(58) Field of Classification Search
CPC ........... H05K 1/18; H05K 2201/10189; H05K 2201/10962; H04W 84/12; G06F 1/185
See application file for complete search history.

(56) References Cited

U.S. PATENT DOCUMENTS

| | | | |
|---|---|---|---|
| 9,703,331 B1 * | 7/2017 | Chien ..................... G06F 1/185 |
| 9,778,708 B1 * | 10/2017 | Meserth ............... H01R 12/721 |
| 10,193,249 B2 | 1/2019 | So et al. |
| 10,474,206 B1 | 11/2019 | Lu et al. |
| 2022/0030730 A1 * | 1/2022 | Hsieh ....................... H05K 7/12 |

* cited by examiner

*Primary Examiner* — Nathan Milakovich
(74) *Attorney, Agent, or Firm* — Larson Newman, LLP

(57) ABSTRACT

A device holder is provided for retaining an M.2 device to a printed circuit board. The device holder includes a standoff portion, a cover portion, and a strap configured to retain the standoff portion to the cover portion. The standoff portion is configured to be affixed to the printed circuit board and to provide a standoff upon which a first end of the M.2 device can be seated. The cover portion is configured, in an open position, to permit the insertion of a second end of the M.2 device into an M.2 connector, and, in a closed position, to retain the M.2 device to the standoff portion.

20 Claims, 6 Drawing Sheets

(Open)         (Closed)

FIG. 3A
(Open)

FIG. 3B
(Closed)

*FIG. 4E*
(Open)

*FIG. 4F*
(Closed)

M.2 WLAN MODULE HOLDER

FIELD OF THE DISCLOSURE

This disclosure generally relates to information handling systems, and more particularly relates to an M.2 WLAN module holder for an information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A device holder may be provided for retaining an M.2 device to a printed circuit board. The device holder may include a standoff portion, a cover portion, and a strap configured to retain the standoff portion to the cover portion. The standoff portion may be configured to be affixed to the printed circuit board and to provide a standoff upon which a first end of the M.2 device can be seated. The cover portion may be configured, in an open position, to permit the insertion of a second end of the M.2 device into an M.2 connector, and, in a closed position, to retain the M.2 device to the standoff portion.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
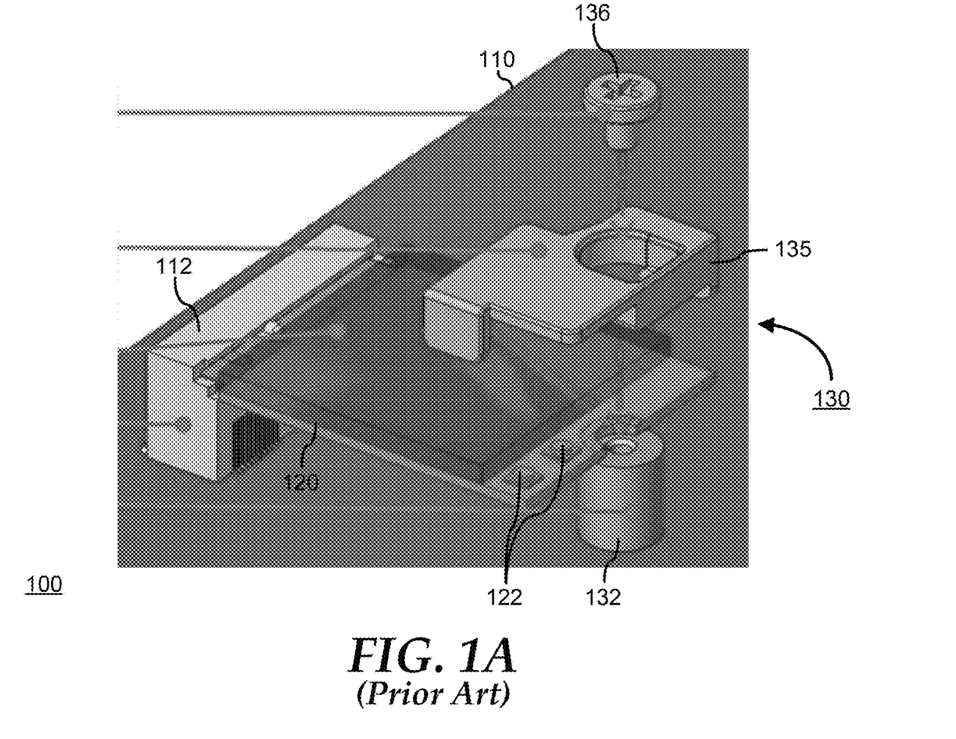
FIGS. 1A and 1B are perspective views of an M.2 device installation assembly as may be known in the art.
Figure 1B:
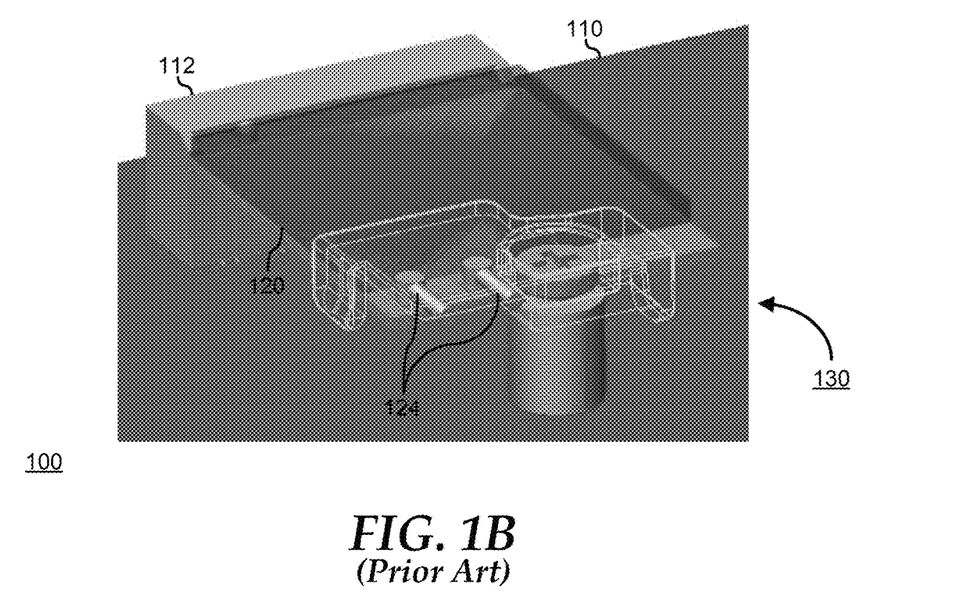

FIG. 1A illustrates an M.2 device installation assembly 100 as may be known in the art. Assembly 100 represents a mounting arrangement for installing an M.2 device within an information handling system. M.2 devices represent integrated devices that comport with one or more standards and specifications as defined by the PCI Special Interest Group (PCISIG). In particular, assembly 100 represents a mounting arrangement for installing an M.2 Wireless Local Area Network (WLAN) card 120 onto a printed circuit board (PCB) 110. As such, arrangement 100 includes PCB 110, an M.2 connector 112, WLAN card 120, and an M.2 device holder 130. WLAN card 120 includes coaxial cable connectors 122. Coax connectors 122 represent sockets into which coaxial cables 124 (as shown in FIG. 1B) are installed. Holder 130 includes a standoff 132, a cover 135, and a retaining screw 136. Standoff 132 provides rigid support for WLAN card 120 at the end of the WLAN card opposite to connector 112, and is typically fabricated of a metal material to provide a ground connection between the WLAN card and a ground plane of PCB 110.

In assembling assembly 100, connector 112 is affixed to PCB 110 in a prior assembly operation, such as a surface mount process, or the like. Further, standoff 132 may be pre-installed into a predetermined location on PCB, or may be installed into the location at the time assembly 100 is assembled. In either case, a technician installs coaxial cables 124 into coaxial connectors 122. Then the technician plugs WLAN card 120 into connector 112. When correctly located, a notch in the end of WLAN card 120 is collocated with standoff 132, and cover 135 can be placed atop the WLAN card with a screw hole aligned with the standoff. Finally, screw 136 is placed into the screw hold of cover 135 and is tightened into standoff 132. In this way, WLAN card 120 is firmly plugged into connector 112 and secured to PCB 110. In addition, coaxial cables 124 are secured by cover 135 such that the coaxial cables can not be disconnected from coax connectors 122.

The inventors of the current disclosure have understood that the assembly steps needed to assemble an M.2 WLAN card to a PCB, as described above, are complex, time consuming, and prone to failures. In particular, assembly 100 requires three (3) parts (a standoff, a cover, and a screw) to mount the WLAN card. Such a part count represents a burden on an inventory system for manufacturing or repairing information handling systems with such assemblies. Moreover the time needed to install a standoff, plug coax cables into coax connectors, plug the WLAN card into a connector, place the cover atop the WLAN card, and install and tighten a screw is significant and adds to the cost of assembly and repair. For example, the inventors of the current disclosure have found such an assembly process to typically take more than 100 seconds. Finally, the typical coax cable/coax connector pair for an M.2 WLAN card is subject to damage if not correctly installed. For example, a misalignment of the coax cable with the coax connector can crush delicate contact elements within either the coax cable or the coax connector. Where the coax cable is damaged, an entire antenna assembly may need to be replaced, and a damaged coax connector may not be repairable on the WLAN card, rendering the WLAN card unusable. As such, it has been understood by the inventors of the current disclosure that a simpler, quicker, and less failure-prone mechanism for securing M.2 WLAN cards to a PCB is highly desirable.

Figure 2:
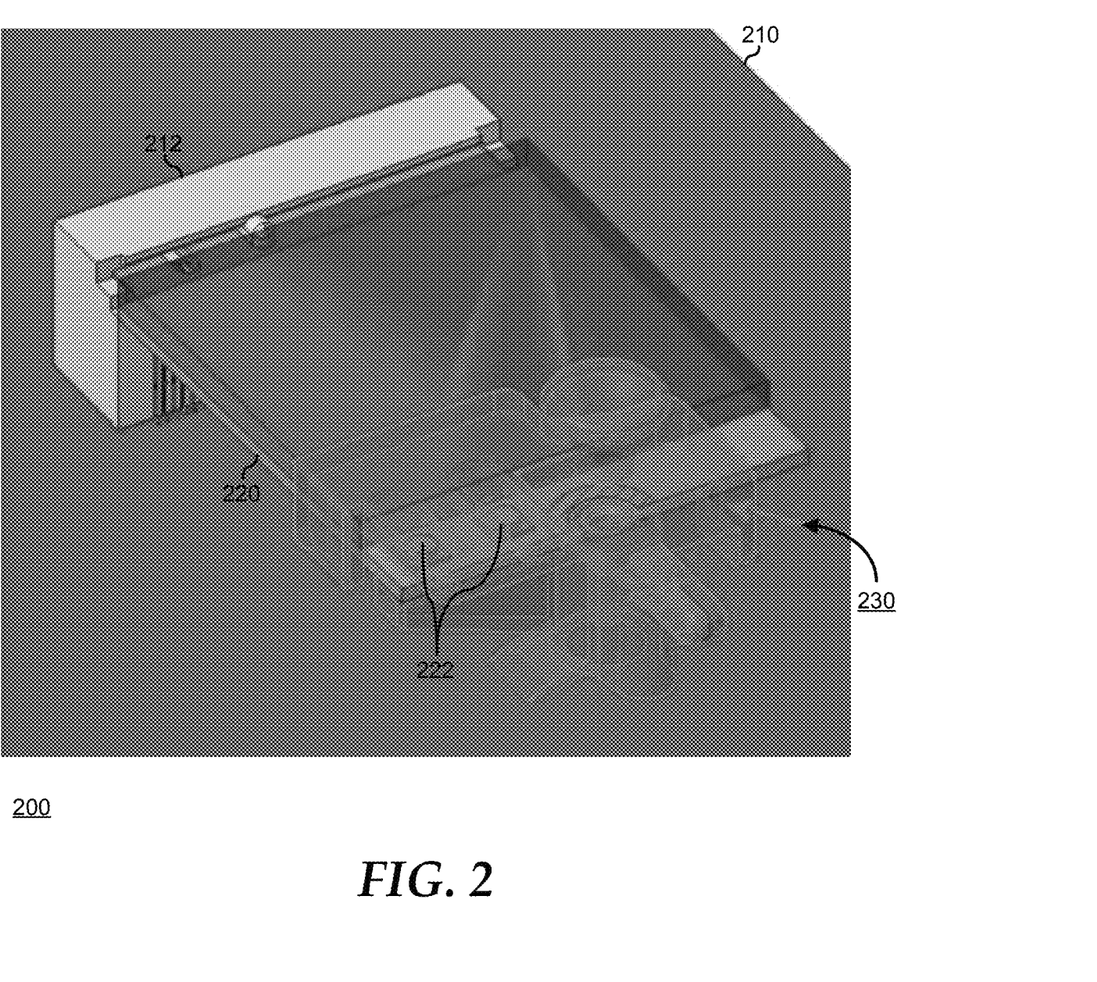
FIG. 2 is a perspective view of an M.2 device installation assembly according to an embodiment of the current disclosure.

FIG. 2 illustrates an embodiment of an M.2 device installation assembly 200. Assembly 200 represents a mounting arrangement for installing an M.2 device, similar to assembly 100, and includes a PCB 210, an M.2 connector 212 similar to connector 112, a WLAN card 220 similar to WLAN card 120, and an M.2 device holder 230. WLAN card 220 includes coaxial cable connectors 22 into which coaxial cables 224 (as shown in FIG. 4 as described below) are installed. Holder 230 is a single-piece holder that is configured, in an open position, to permit the installation of WLAN card 220, as described below, and, in a closed position, to retain the WLAN card similarly to the retention provided by holder 130, as described below.

Figure 3A:
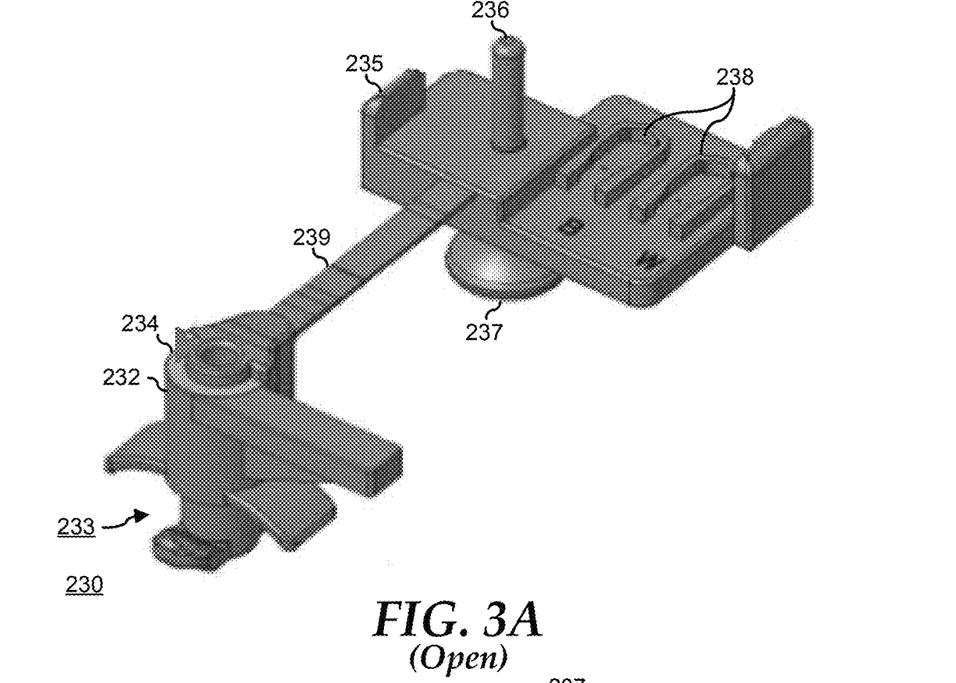
FIGS. 3A and 3B are perspective views of an M.2 device holder according to an embodiment of the current disclosure.
Figure 3B:
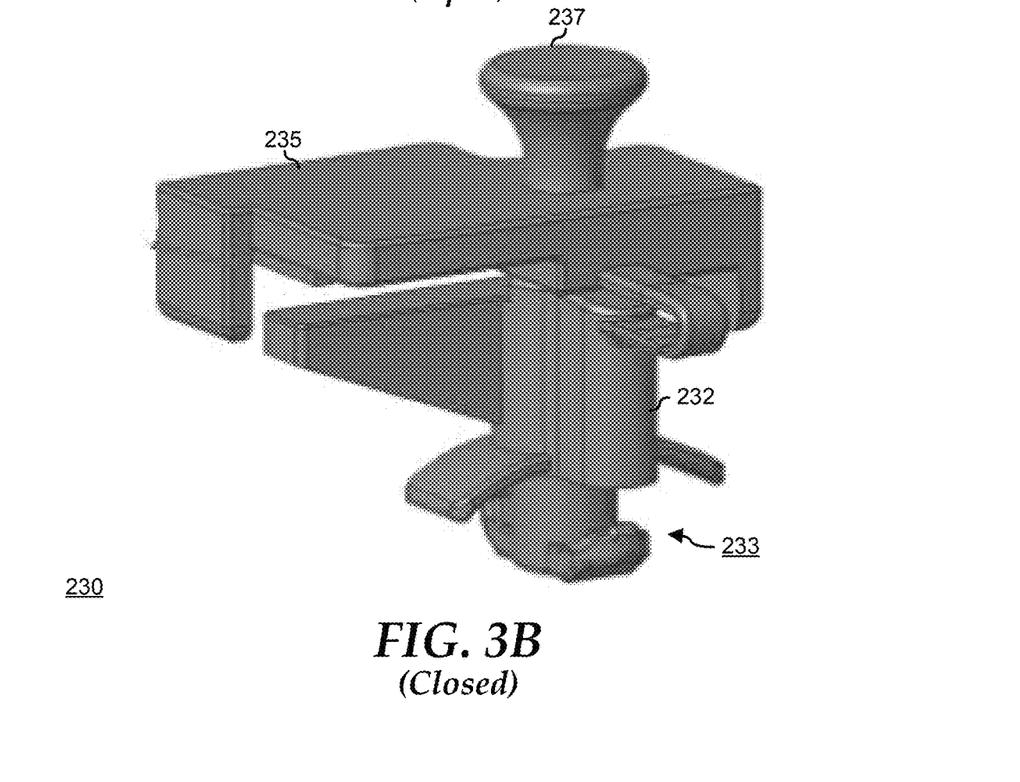

FIG. 3A illustrates holder 230 in the open position. Holder 230 includes a standoff portion 232 with a standoff retainer 233 and a metallic ground contact 234, and a cover portion 235 with a locating stud 236, a knob 237, and coax cable mounts 238. Standoff portion 232 and cover portion 235 are joined by a strap 239. Standoff portion 232 provides rigid support for WLAN card 220 at the end of the WLAN card opposite to connector 212. Standoff retainer 233 provides a retainer mechanism whereby holder 230 is secured to PCB 210 through a hole in the PCB and retains the holder securely to the PCB. Metallic ground contact 234 provides a ground connection between the WLAN card and a ground plane of PCB 110. Cover portion 235 provides similar functionality to cover 135, being closable (as shown in FIG. 3B, below), to secure WLAN card 220 to PCB 210 and to hold coax cables firmly in place. However, cover portion 235 provides additional functionality. In particular, coax cable mounts 238 provide fittings into which the coax cables are inserted, and are secured and keyed in a location that ensures proper alignment with the coax connectors on WLAN card 220, as describe further below.

FIG. 3B illustrates holder 230 in the closed position. When the coax cables are inserted and secured, and WLAN card 220 is installed, cover portion 235 is folded over to engage locating stud 236 into a guide hold in standoff portion 232, and pressed home such that the locating stud is fully inserted into the guide hole. The act of fully inserting locating stud 236 into the guide hole of standoff portion 232 acts to connect the coax cables to the coax connectors of WLAN card 220, as described further below. In a particular embodiment, locating stud 236 includes a retention mechanism such that, when fully inserted into the guide hole of standoff portion 232, cover 235 is locked into place. For example, locating stud 236 may include a retention ridge that widens the diameter of the locating stud at an end of the locating stud that can engage with a retention ridge at the bottom of the guide hole that keeps cover portion 235 from disengaging from standoff portion 232. In another example, a retention groove can be formed at the bottom of the guide hole that compliments the retention ridge to retain cover 235. Knob 237 is utilized as a surface to depress locating stud 236 firmly into the guide hole of standoff portion 232, and to grasp for disengaging cover 235 from the standoff portion to repair or replace WLAN card 220, as needed or desired.

Figure 4A:
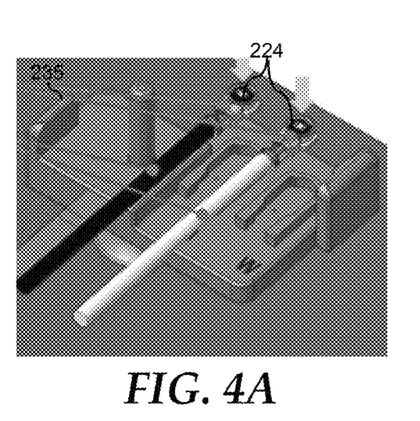
FIGS. 4A-4G are views illustrating a method for assembling the M.2 device installation of FIG. 2.
Figure 4B:
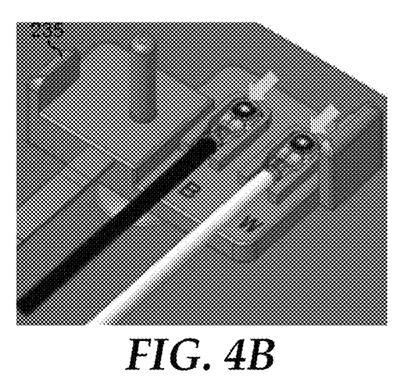
Figure 4C:
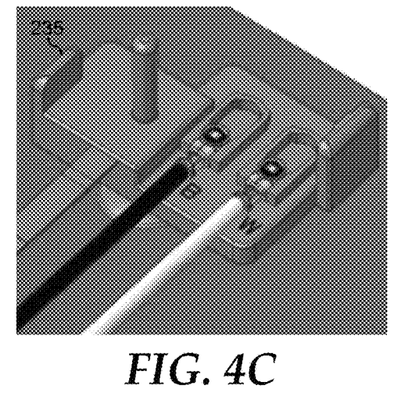
Figure 4D:
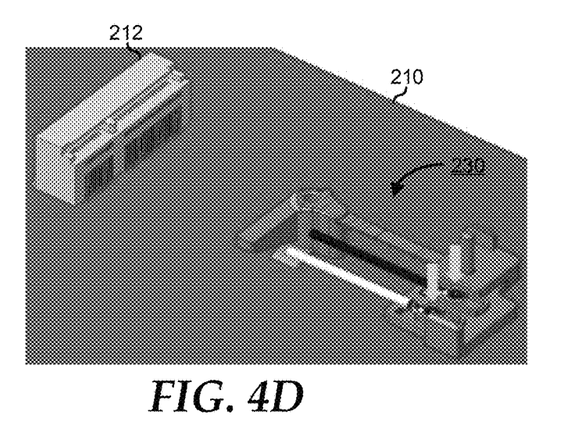
Figure 4E:
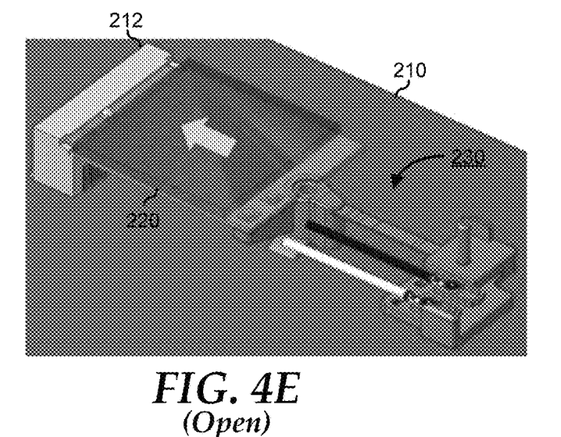
Figure 4F:
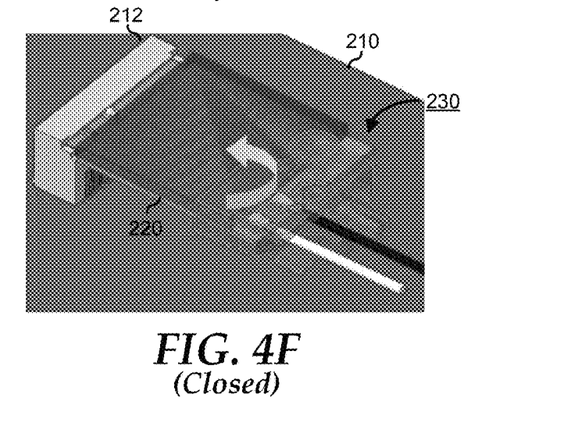
Figure 4G:
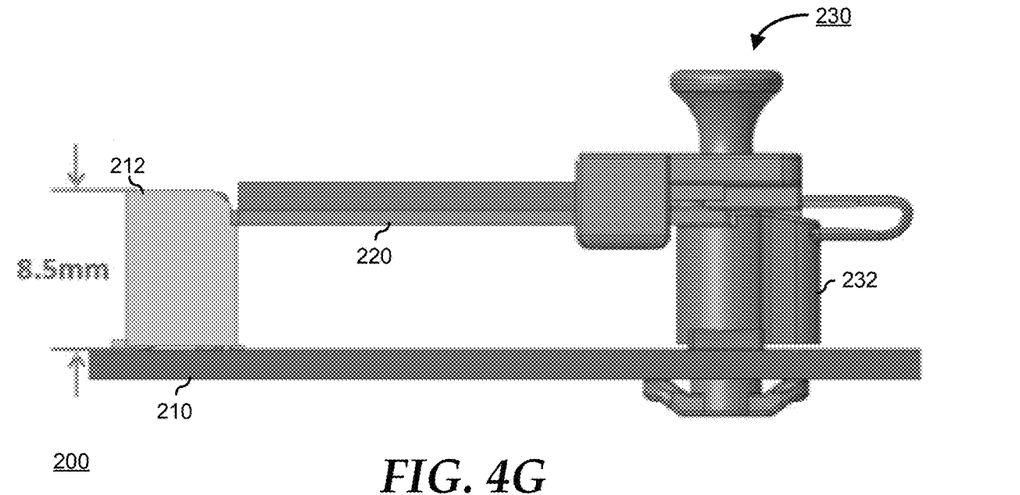

FIGS. 4A-4G illustrate a method for utilizing holder 230. In FIG. 4A, coax cables 224 are situated over cover portion 235, and are installed into coax cable mounts 238 in FIG. 4B. Coax cables 224 are pulled into respective coax cable mounts 238 to lock the coax cables into a predetermined position in FIG. 4C. FIG. 4D illustrates holder 230 installed on PCB 210. WLAN card 220 is plugged into connector 212 in FIG. 4E, and cover portion 235 is closed in FIG. 4F to retain WLAN card 220 and to plug coax cables 224 into coax connectors of the WLAN card. FIG. 4G illustrates a side view of assembly 200 with WLAN card 220 plugged into connector 212 and with holder 230 closed. Connector 212 is shown as having a height of 8.5 mm, and standoff portion 232 has a height commensurate with the height of the connector.

Figure 5:
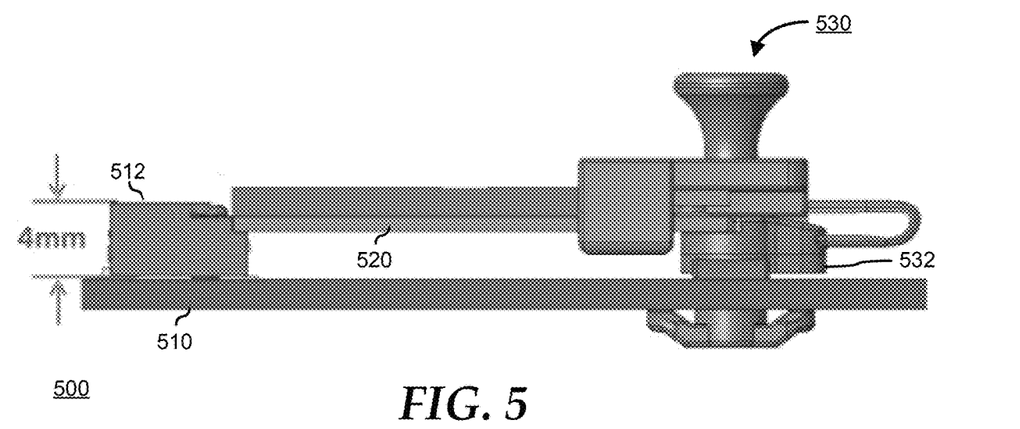
FIG. 5 is a side view of an M.2 device installation assembly according to another embodiment of the current disclosure.

FIG. 5 shows an assembly 500 similar to assembly 200. Connector 512 is mounted to a PCB 510, and a WLAN card 520 is plugged into the connector. A holder 530 similar to holder 230 is affixed to PCB 500 and is closed to retain WLAN card 520. Connector 512 is shown as having a height of 4.0 mm, and standoff portion 532 has a height commensurate with the height of the connector. Other connector heights and standoff heights may be utilized, as needed or desired.

Figure 6:
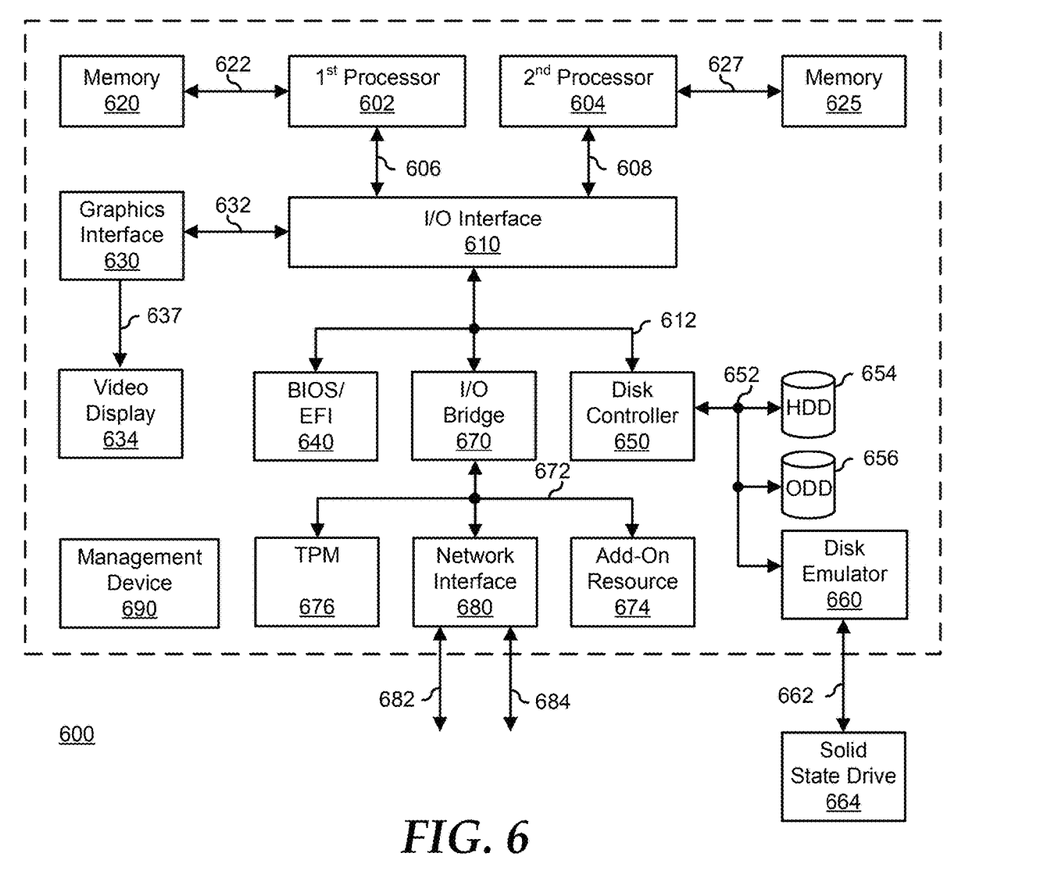
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 664, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 664, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 625 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 2394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device holder for retaining an M.2 device to a printed circuit board, the device holder comprising:
    a standoff portion configured to be affixed to the printed circuit board and to provide a standoff upon which a first end of the M.2 device can be seated;
    a cover portion; and
    a strap configured to retain the standoff portion to the cover portion;
    wherein the cover portion is configured, in an open position, to permit the insertion of a second end of the M.2 device into an M.2 connector and, in a closed position, to retain the M.2 device to the standoff portion.

2. The device holder of claim 1, wherein the cover portion includes a cable mount to mount a cable to be electrically coupled to the M.2 device.

3. The device holder of claim 2, wherein the cable mount is configured to mount a coaxial cable to the cover portion.

4. The device holder of claim 3, wherein the cable mount is further configured to locate the coaxial cable such that, when the cover portion is in the closed position, the coaxial cable is coupled to a coaxial connector of the M.2 device.

5. The device holder of claim 1, wherein the cover portion further includes a locating stud and the standoff portion includes a guide hole to receive the locating stud when the cover portion is in the closed position.

6. The device holder of claim 5, wherein the locating stud includes a first retention ridge to lock the cover portion in the closed position.

7. The device holder of claim 6, wherein the guide hole includes a second retention ridge to engage the first retention ridge to lock the cover portion.

8. The device holder of claim 6, wherein the guide hole includes a retention that compliments the first retention ridge to engage the first retention ridge to lock the cover portion.

9. The device holder of claim 1, wherein the standoff portion includes a standoff retainer to secure the device holder to the printed circuit board.

10. The device holder of claim 1, wherein the cover portion includes a knob to open and close the cover portion.

11. A method for retaining an M.2 device to a printed circuit board, the method comprising:
    securing a standoff portion of a device holder to the printed circuit board, the device holder including a cover portion and a strap to retain the standoff portion to the cover portion;
    while the cover portion is in an open position, plugging a first end of the M.2 device into an M.2 connector, wherein a second end of the M.2 device is seated on the standoff portion; and
    closing the cover portion to retain the M.2 device to the standoff portion.

12. The method of claim 11, wherein the cover portion includes a cable mount to mount a cable to be electrically coupled to the M.2 device.

13. The method of claim 12, wherein the cable mount is configured to mount a coaxial cable to the cover portion.

14. The method of claim 13, wherein the cable mount is further configured to locate the coaxial cable such that, when the cover portion is in the closed position, the coaxial cable is coupled to a coaxial connector of the M.2 device.

15. The method of claim 11, wherein the cover portion further includes a locating stud and the standoff portion includes a guide hole to receive the locating stud when the cover portion is in the closed position.

16. The method of claim 15, wherein the locating stud includes a first retention ridge to lock the cover portion in the closed position.

17. The method of claim 16, wherein the guide hole includes a second retention ridge to engage the first retention ridge to lock the cover portion.

18. The method of claim 16, wherein the guide hole includes a retention that compliments the first retention ridge to engage the first retention ridge to lock the cover portion.

19. The method of claim 11, wherein the standoff portion includes a standoff retainer to secure the device holder to the printed circuit board.

20. A printed circuit board, comprising:
    an M.2 connector affixed to the printed circuit board and configured to connect to a first end of an M.2 device; and
    a device holder for retaining the M.2 device to a printed circuit board, the device holder including:
        a standoff portion configured to be affixed to the printed circuit board and to provide a standoff upon which a second end of the M.2 device can be seated;
        a cover portion; and
        a strap configured to retain the standoff portion to the cover portion;
        wherein the cover portion is configured, in an open position, to permit the insertion of the M.2 device into an M.2 connector, and in a closed position to retain the M.2 device to the standoff portion.

* * * * *